(12) United States Patent
Jessup et al.

(10) Patent No.: US 11,556,316 B2
(45) Date of Patent: Jan. 17, 2023

(54) DISTRIBUTED EXTENSIBLE DYNAMIC GRAPH (71) Applicant: Intuit Inc., Mountain View, CA (US)

(72) Inventors: Jeremy Alan Jessup, San Diego, CA (US); Matthew Ryan Richardson, San Diego, CA (US); Anant Saxena, San Diego, CA (US); Varadarajan Sriram, San Diego, CA (US); Nathan George Wiger, San Diego, CA (US); Matthew Sivertson, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/219,502

(22) Filed: Mar. 31, 2021

(65) Prior Publication Data
US 2022/0317984 A1  Oct. 6, 2022

(51) Int. Cl.
G06F 9/44      (2018.01)
G06F 8/36      (2018.01)
G06F 16/901    (2019.01)
G06F 8/41      (2018.01)

(52) U.S. Cl.
CPC .............. G06F 8/36 (2013.01); G06F 8/437 (2013.01); G06F 16/9024 (2019.01)

(58) Field of Classification Search
CPC ............................. G06F 8/36; G06F 16/9024
USPC ........................................................ 717/107
See application file for complete search history.

(56) References Cited

U.S. PATENT DOCUMENTS

| 7,461,073 | B2* | 12/2008 | Gao | G06F 16/285 |
| | | | | 707/999.102 |
| 8,090,754 | B2* | 1/2012 | Schmidt | G06F 16/284 |
| | | | | 707/726 |
| 8,640,086 | B2* | 1/2014 | Bonev | G06F 11/3664 |
| | | | | 717/113 |

(Continued)

FOREIGN PATENT DOCUMENTS

| WO | WO-2015133947 A1 * | 9/2015 | ....... G06F 17/30327 |
| WO | WO-2020068831 A1 * | 4/2020 | ......... G06F 16/9024 |

OTHER PUBLICATIONS

Ville Touronen; "Microservice architecture patterns with GraphQL"; Helsinki Mar. 24, 2019—University of Helsinki Department of Computer Science.*

(Continued)

Primary Examiner — Francisco J Aponte
(74) Attorney, Agent, or Firm — Ferguson Braswell Fraser Kubasta PC (57) ABSTRACT A method may include receiving a first definition of an object type from a first software component and a second definition of the object type from a second software component. The object type may be labeled by an ID. The method may further include storing, in a dynamic graph, a node labeled by the ID, and storing, in a type definition repository external to the dynamic graph, the first definition of the object type and the second definition of the object type. The method may further include receiving, from the first software component, a modified first definition of the object type. The method may further include replacing, in the type definition repository and using the ID, the first definition of the object type with the modified first definition, and transmitting, to the second software component, a message indicating a need to lookup, by the ID, the modified first definition.

20 Claims, 8 Drawing Sheets

(56) References Cited

U.S. PATENT DOCUMENTS

| | | | | |
|---|---|---|---|---|
| 9,164,998 | B2* | 10/2015 | Klevenz | G06F 16/113 |
| 9,424,323 | B2* | 8/2016 | Mishra | G06F 16/258 |
| 9,454,350 | B2* | 9/2016 | Auerbach | G06F 30/327 |
| 9,645,833 | B2* | 5/2017 | Mueller | G06F 9/44505 |
| 9,659,051 | B2* | 5/2017 | Hutchins | G06F 16/211 |
| 9,753,744 | B1* | 9/2017 | Wells | G06F 9/546 |
| 9,772,890 | B2* | 9/2017 | Ekanadham | G06F 9/547 |
| 9,804,886 | B1* | 10/2017 | Wells | G06F 9/5033 |
| 9,892,207 | B2* | 2/2018 | Schmidt | G06F 16/86 |
| 10,120,655 | B2* | 11/2018 | Wrighton | G06F 12/0269 |
| 10,180,821 | B2* | 1/2019 | Larson | G06F 8/34 |
| 10,380,489 | B2* | 8/2019 | Ankisettipalli | G06F 40/237 |
| 10,409,828 | B2* | 9/2019 | Abdelhamid | G06F 16/2465 |
| 10,528,958 | B2* | 1/2020 | Yang | G06Q 20/4016 |
| 10,963,459 | B2* | 3/2021 | Schmidt | G06F 21/6218 |
| 11,016,968 | B1* | 5/2021 | Hoover | G10L 15/22 |
| 11,093,548 | B1* | 8/2021 | Pang | G06F 16/2477 |
| 11,106,715 | B1* | 8/2021 | Ju | G06F 16/35 |
| 11,108,627 | B2* | 8/2021 | Smith | H04L 41/0806 |
| 11,113,293 | B2* | 9/2021 | Jin | G06F 16/2465 |
| 11,200,143 | B2* | 12/2021 | Jones | G06F 8/433 |
| 11,204,745 | B2* | 12/2021 | Gupta | G06F 8/45 |
| 11,226,978 | B2* | 1/2022 | Tamjidi | G06F 16/211 |
| 2016/0103871 | A1* | 4/2016 | Zheng | G06F 16/254 707/766 |
| 2016/0103898 | A1* | 4/2016 | Zheng | G06F 16/289 707/602 |
| 2016/0103932 | A1* | 4/2016 | Sathish | G06F 9/4451 715/767 |
| 2016/0239276 | A1* | 8/2016 | MacLean | G06F 8/433 |
| 2017/0346875 | A1* | 11/2017 | Wells | G06F 9/5033 |
| 2018/0053328 | A1* | 2/2018 | Simonovic | G06T 11/206 |
| 2018/0232403 | A1* | 8/2018 | Bhatti | G06F 16/9024 |
| 2018/0365614 | A1* | 12/2018 | Palmer | G06Q 10/103 |
| 2019/0332956 | A1* | 10/2019 | Ankisettipalli | G06F 40/30 |
| 2019/0361900 | A1* | 11/2019 | Rogynskyy | G06F 16/313 |
| 2020/0004730 | A1* | 1/2020 | Brown | G06F 16/248 |
| 2020/0311085 | A1* | 10/2020 | Lucas | G06F 16/9024 |
| 2021/0004418 | A1* | 1/2021 | Norman | G06F 16/2423 |
| 2021/0019325 | A1* | 1/2021 | Edge | H04L 51/22 |
| 2021/0141831 | A1* | 5/2021 | Sherman | G06F 16/904 |
| 2021/0263887 | A1* | 8/2021 | Malecki | G06F 16/14 |
| 2021/0279045 | A1* | 9/2021 | Ko | G06F 8/48 |
| 2021/0294679 | A1* | 9/2021 | Thakur | G06F 8/315 |
| 2021/0342247 | A1* | 11/2021 | Ciolek | G06F 11/3438 |
| 2021/0373860 | A1* | 12/2021 | Khan | G06F 9/546 |
| 2022/0019907 | A1* | 1/2022 | Georgopoulos | G06F 40/30 |

OTHER PUBLICATIONS

Valentino Gagliardi; "Decoupled Django: Understand and Build Decoupled Django Architectures for JavaScript Front-ends"; Apress 2021.*

Jeremias Snellman; "Implementation and Evaluation of a Graphql-Based Web AP-Plication for Project Follow Up"; University of Vaasa School of Technology and Innovation Automation and Computer Science—Vaasa Aug. 27, 27.*

Raj Parmar et al. "MongoDB as an Efficient Graph Database: An Application of Document Oriented NOSQL Database"; Data Intensive Computing Applications for Big Data—IOS Press, 2018.*

Raees Khan et al. "Sustainable IoT Sensing Applications Development through GraphQL-Based Abstraction Layer"; MDPI, Electronics 2020.*

Github, "Appolo iOS", https://github.com/apollographql/apollo-ios, Jan. 1, 2021, 4 pages.

Realm.io, "Build Better Apps, Faster", https://realm.io/, Jan. 1, 2021, 4 pages.

* cited by examiner

DISTRIBUTED EXTENSIBLE DYNAMIC GRAPH

BACKGROUND

Efficiently synchronizing changes to object type definitions in an object type graph shared among decoupled software components may be challenging. For example, the software components may reside on different computing systems in different locations in different time zones. Conventional approaches require re-compiling the object type graph to a new version when object type definitions are changed. A capability that supports dynamic (e.g., run-time) changes to object type definitions would avoid the overhead incurred by re-compiling the object type graph when object type definitions are changed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving a first definition of an object type from a first software component and a second definition of the object type from a second software component. The object type is labeled by an ID. The method further includes storing, in a dynamic graph, a node labeled by the ID, and storing, in a type definition repository external to the dynamic graph, the first definition of the object type and the second definition of the object type. The first definition of the object type and the second definition of the object type are indexed by the ID. The method further includes receiving, from the first software component, a modified first definition of the object type. The modified first definition resulted from a modification to the first definition of the object type by a user. The method further includes replacing, in the type definition repository and using the ID, the first definition of the object type with the modified first definition, and transmitting, to the second software component, a message indicating a need to lookup, by the ID, the modified first definition. Transmitting the message is triggered by the modification of the first definition.

In general, in one aspect, one or more embodiments relate to a system including a computer processor, and a data repository configured to store a dynamic graph, and a type definition repository external to the dynamic graph. The type definition repository is configured to store a first definition of an object type, and a second definition of the object type. The first definition of the object type and the second definition of the object type are indexed by the ID. The object type is labeled by an ID. The system further includes a dynamic graph manager executing on the computer processor and configured to receive the first definition of an object type from a first software component and the second definition of the object type from a second software component, store, in the dynamic graph, a node labeled by the ID, store, in the type definition repository, the first definition of the object type and the second definition of the object type, and receive, from the first software component, a modified first definition of the object type. The modified first definition resulted from a modification to the first definition of the object type by a user. The dynamic graph manager is further configured to replace, in the type definition repository and using the ID, the first definition of the object type with the modified first definition, and transmit, to the second software component, a message indicating a need to lookup, by the ID, the modified first definition. Transmitting the message is triggered by the modification of the first definition.

In general, in one aspect, one or more embodiments relate to a method including obtaining a first definition of an object type from a first software component. The object type is labeled by an ID. The method further includes transmitting the first definition of the object type to a dynamic graph manager configured to: receive a second definition of the object type from a second software component, store, in a dynamic graph, a node labeled by the ID, and store, in a type definition repository external to the dynamic graph, the first definition of the object type and the second definition of the object type. The first definition of the object type and the second definition of the object type are indexed by the ID. The dynamic graph manager is further configured to receive, from the second software component, a modified second definition of the object type. The modified second definition resulted from a modification to the first definition of the object type by a user. The dynamic graph manager is further configured to replace, in the type definition repository and using the ID, the second definition of the object type with the modified second definition, and transmit, to the first software component, a message indicating a need to lookup, by the ID, the modified second definition. Transmitting the message is triggered by the modification of the second definition. The method further includes receiving, from the dynamic graph manager and by the first software component, the message.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Conventional approaches to synchronizing changes to object type definitions in an object type graph shared among decoupled software components typically require re-compiling the object type graph to a new version when object type definitions are changed. This disclosure provides a new capability that supports incremental, collaborative modifications to a dynamic graph without re-compiling the dynamic graph. Definitions of object types labeled by IDs are received from software components. The nodes in the dynamic graph are also labeled by the IDs and correspond to the object types. The dynamic graph represents the dependencies among object types without representing the definitions of the object types. That is, the definitions of the object types are stored in a type definition repository external to the dynamic graph. Because object type definitions are stored external to the dynamic graph, the dynamic graph does not need modification (e.g., recompilation) when object type definitions are modified. Thus, software components may continue to access a current version of the dynamic graph, and lookup modified object type definitions in the type definition repository by the IDs that label the modified object types. A message indicating a need to lookup a modified object type definition, by the ID that labels the modified object type, may be transmitted to software components that are dependent on the modified object type. A software component may be dependent on an object type when the software component defines the object type, defines an ancestor type of the object type, and/or defines a descendant type of the object type.

Thus, the disclosed invention efficiently synchronizes changes to object type definitions in a dynamic graph shared among decoupled software components without cumbersome re-compilation of the dynamic graph. As a result, the reliability, maintainability, and modularity of collaboratively developed code may be improved.

Figure 1A:
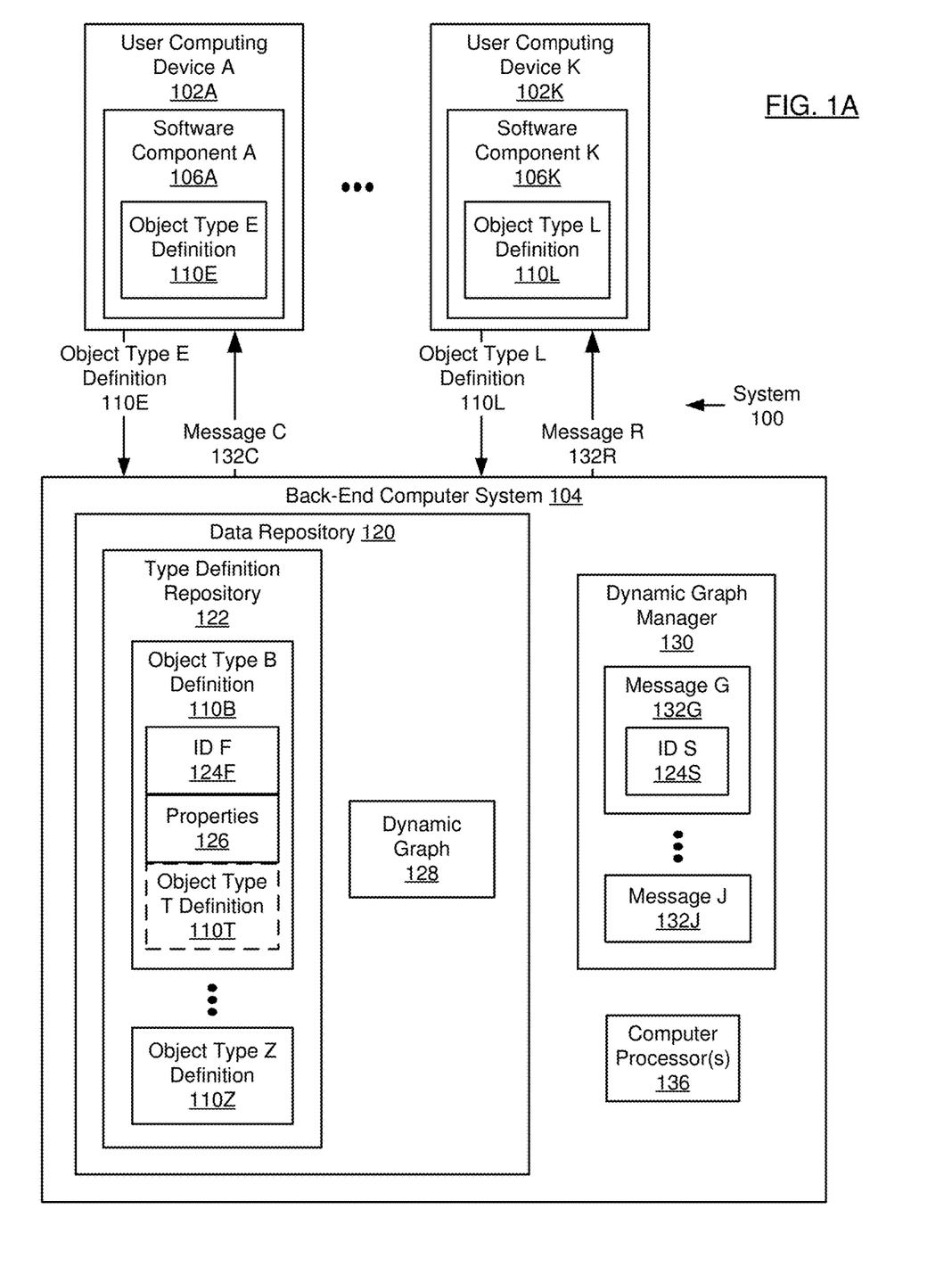
FIG. 1A and FIG. 1B show a system in accordance with one or more embodiments of the invention.

FIG. 1A shows a diagram of a system (100) in accordance with one or more embodiments. As shown in FIG. 1A, the system (100) includes multiple components such as the user computing devices (102A, 102K) and a back-end computer system (104). Each of these components is described below.

The back-end computer system (104) includes a data repository (120), a dynamic graph manager (130), and computer processor(s) (136). In one or more embodiments, the computer processor(s) (136) takes the form of the computer processor(s) (502) described with respect to FIG. 5A and the accompanying description below. The data repository (120) is any type of storage unit and/or device (e.g., a file system, database, collection of tables, or any other storage mechanism) for storing data. Further, the data repository (120) may include multiple different storage units and/or devices. The multiple different storage units and/or devices may or may not be of the same type or located at the same physical site. The data repository (120) may be accessed online via a cloud service (e.g., Oracle Cloud, Amazon Web Services (AWS), Egnyte, Azure, etc.).

Alternatively, in one or more embodiments, the data repository (120), dynamic graph manager (130), and computer processor(s) (136) may be included within a user computing device (102A) (e.g., a mobile computing device).

The data repository (120) includes functionality to store a type definition repository (122) and a dynamic graph (128). The type definition repository (122) includes object type definitions (110B, 110Z). An object type definition (110B) is a data structure that defines an object type. The object type is a category (e.g., a class) of object. An object type definition (110B) includes an ID (124F), one or more properties (126), and optionally a reference to an object type definition (110T). The ID (124F) is a label of an object type. A property (126) is an attribute (e.g., a field) that describes the object type. In one or more embodiments, each property (126) is stored in a separate table (e.g., a relational table). An object type definition (110B) may further include constraints on the values of properties. The object type definition (110T) may define a "child" object type of the "parent" object type defined in object type definition (110B). Thus, the parent object type definition (110B) may recursively define an object type in terms of a child object type. As an example, if object type definition A includes a reference to object type definition B, then an instance of object type A may include an instance of object type B. Continuing this example, object type A may be implemented as relational table $T_A$ and object type B may be implemented as relational table $T_B$, where relational table $T_A$ includes a foreign key to relational table $T_B$. The parent object type definition (110B) may include references to multiple child object type definitions.

The object type definition (110B) may be indexed in the type definition repository (122) by the ID (124F). For example, the object type definition (110B) may be returned as a result of a query submitted to the type definition repository (122) that matches the ID (124F) of the object type definition (110B). For example, a query may match the ID (124F) of the object type definition (110B) when the query specifies the ID (124F) of the object type definition (110B). As another example, the query may specify a string that matches the object type definition (110B), where the string includes one or more wildcard characters. Other examples of queries may specify regular expressions or inequality operations.

The dynamic graph (128) includes nodes corresponding to object types, and links that represent dependencies between object types. Each node is labeled with the ID of the corresponding object type. The dynamic graph (128) may be labeled by a version ID. For example, the version ID may correspond to a location (e.g., a filename) where the dynamic graph (128) is stored in the back-end computer system (104). Because object type definitions (110B, 110Z) are stored in a type definition repository (122) that is external to the dynamic graph (128), the dynamic graph (128) not need be modified when an object type definition (110B) is modified.

Figure 1B:
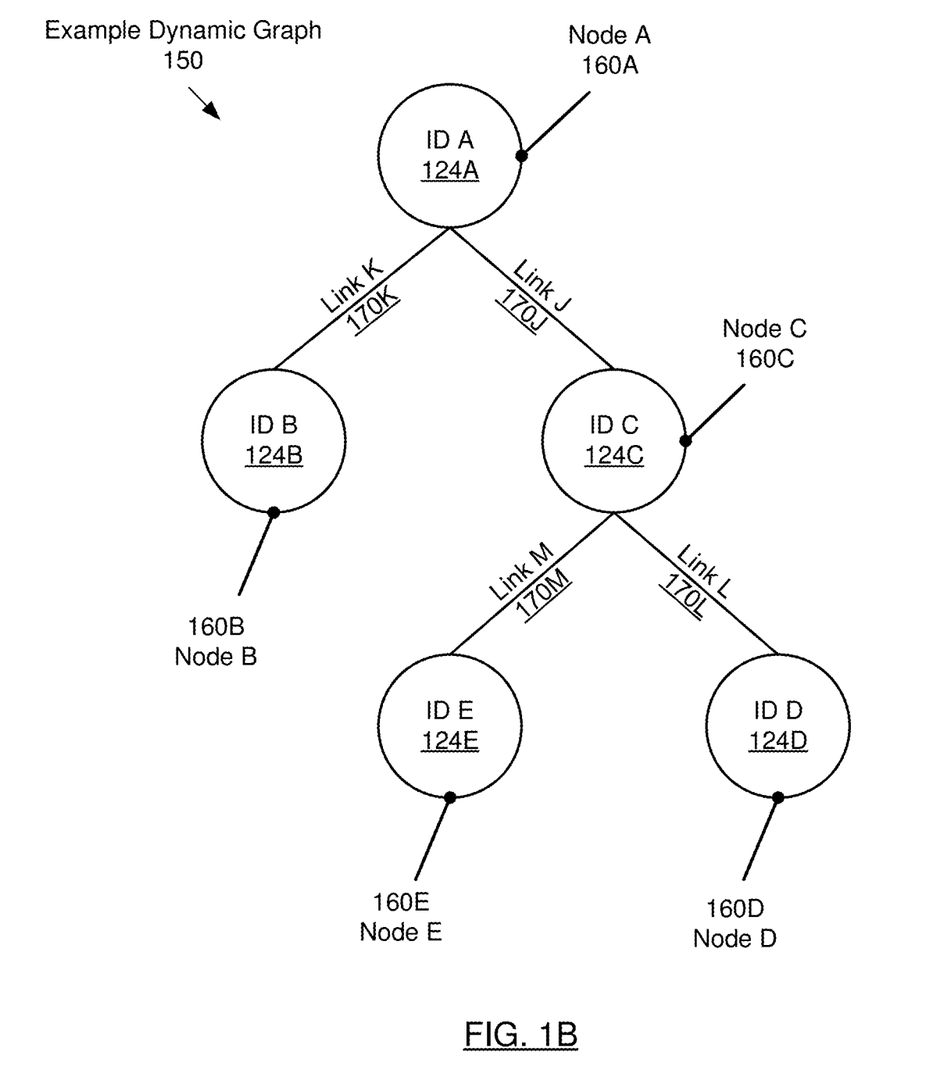

FIG. 1B shows an example dynamic graph (150) that includes nodes (160A, 160B, 160C, 160D, 160E) and links (170J, 170K, 170L, 170M) between the nodes (160A, 160B, 160C, 160D, 160E). The nodes (160A, 160B, 160C, 160D, 160E) are labeled with IDs (124A, 124B, 124C, 124D, 124E) of object types. Node A (160A) corresponds to a parent object type defined in terms of child object types corresponding to node B (160B) and node C (160C). Similarly, node C (160C) is defined in terms of child object types corresponding to node D (160D) and node E (160E).

Figure 5A:
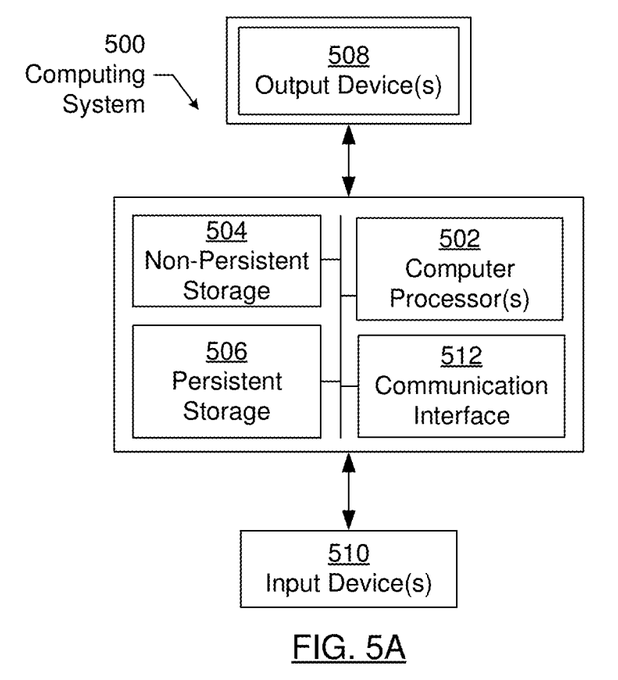
FIG. 5A and FIG. 5B show computing systems in accordance with one or more embodiments of the invention.
Figure 5B:
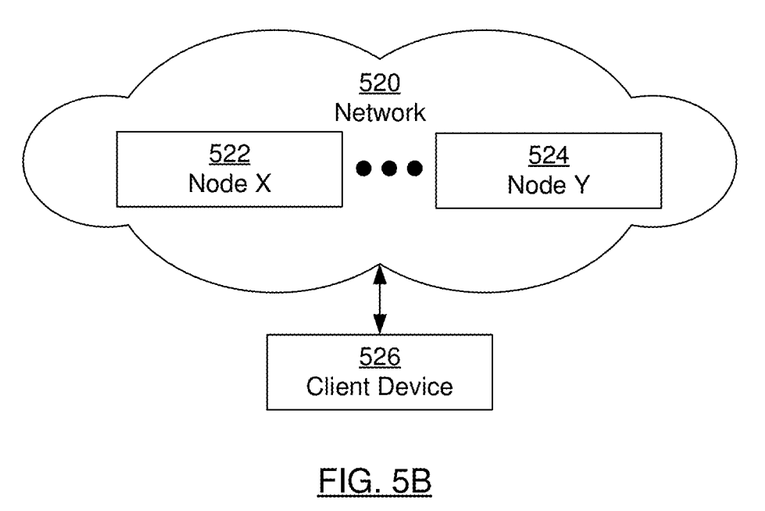

A user computing device (102A) may be a mobile device (e.g., phone, tablet, digital assistant, laptop, etc.) or any other computing device (e.g., desktop, terminal, workstation, etc.) with a computer processor (not shown) and memory (not shown) capable of running computer software. A user computing device (102A) may take the form of the computing system (500) shown in FIG. 5A connected to a network (520) as shown in FIG. 5B.

The user computing devices (102A, 102K) include software components (106A, 106K). A user computing device (102A) may include multiple software components. For example, software components (106A, 106K) may reside on a single user computing device. A software component (106A), in accordance with one or more embodiments, is a computer program written in any programming language that includes executable instructions stored in some sort of memory. The instructions, when executed by one or more processors, enable a device to perform the functions described in accordance with one or more embodiments. The software components (106A, 106K) include object type definitions (110E, 110L). A software component (106A) may include multiple object type definitions. For example, a user of the software component (106A) may define multiple object types. Multiple software components may include definitions of the same object type. For example, users of different software components may define, for the same object type, different properties and/or references to different child object type definitions. Continuing this example, in FIG. 4A and FIG. 4B, software component A (400A) adds, to the object type definition "User," a child object type definition "Job," and software component B (400B) adds, to the object type definition "User," a child object type definition "Car."

The dynamic graph manager (130) includes functionality to receive object type definitions (110E, 110L) from software components (106A, 106K). The dynamic graph manager (130) includes functionality to generate messages (132G, 132J). A message (132G) indicates a need to lookup, by an ID (124S), a modified object type definition. The dynamic graph manager (130) includes functionality to transmit messages (132C, 132R) to software components (106A, 106K). For example, the software component (106A) may be dependent on an object type whose definition has been modified. The dynamic graph manager (130) may include functionality to transmit multiple messages to a software component (106A). For example, the software component (106A) may be dependent on multiple object types whose definitions have been modified.

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
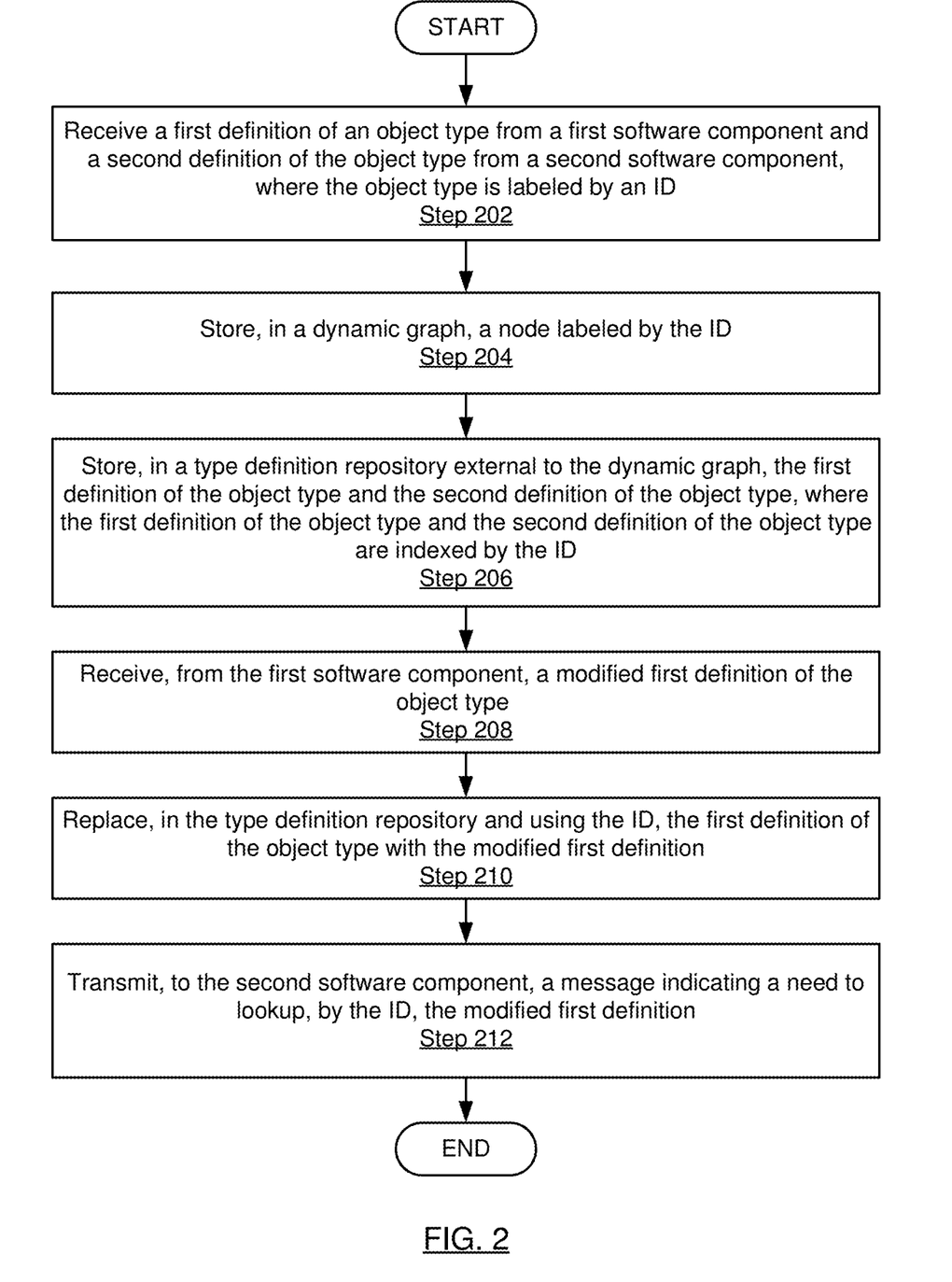
FIG. 2, FIG. 3A and FIG. 3B show flowcharts in accordance with one or more embodiments of the invention.

FIG. 2 shows a flowchart in accordance with one or more embodiments of the invention. The flowchart depicts a process for extending a dynamic graph. One or more of the steps in FIG. 2 may be performed by the components (e.g., the software components (106A, 106K) and the dynamic graph manager (130) of the system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a first definition of a first object type is received from a first software component and a second definition of the first object type is received from a second software component. The first object type is labeled by a first ID. For example, a first user of the first software component may generate the first definition of the first object type and a second user of the second software component may generate the second definition of the first object type.

Figure 4A:
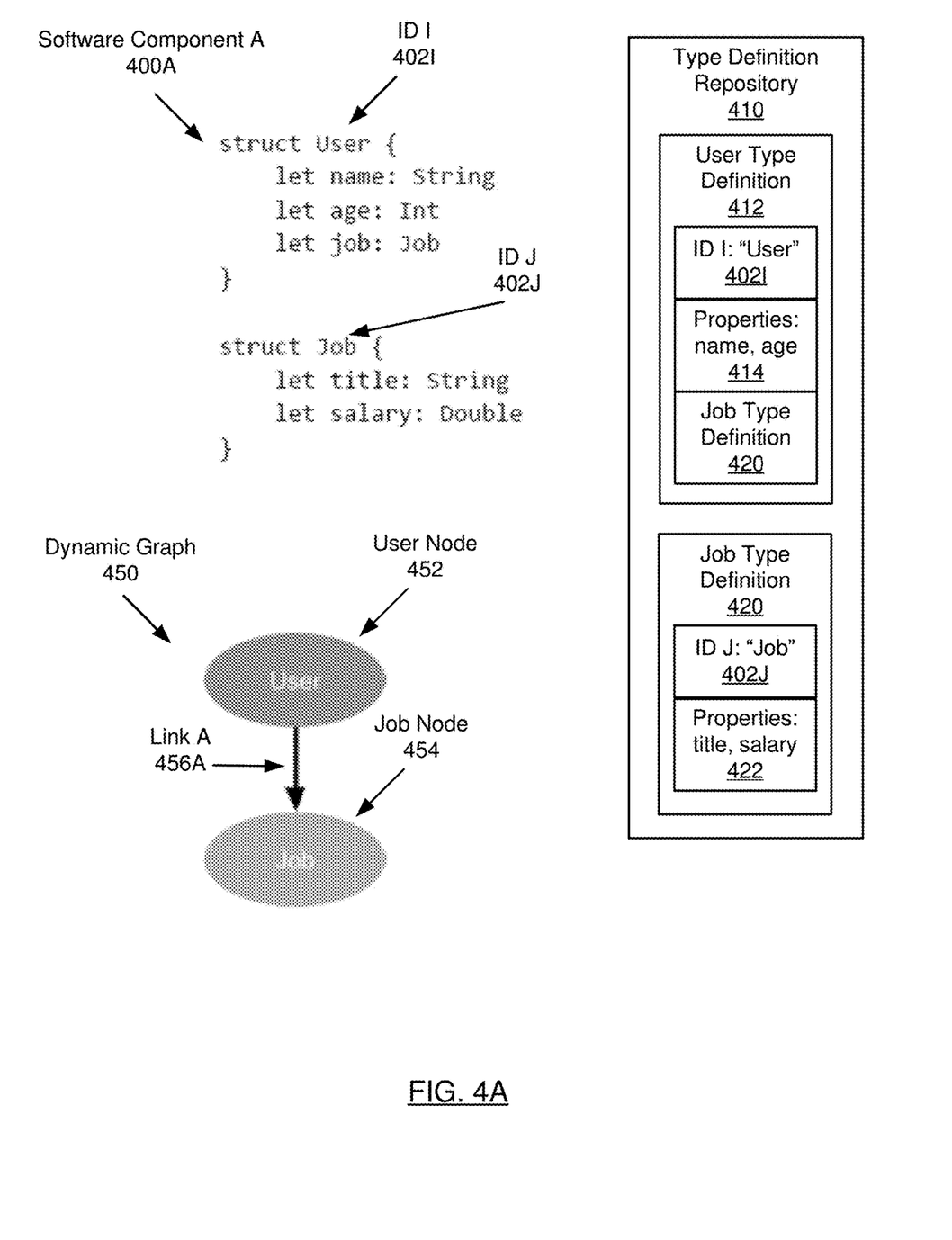
FIG. 4A and FIG. 4B show examples in accordance with one or more embodiments of the invention.

In one non-limiting scenario, the first definition of the first object type includes a reference to a second object type labeled by a second ID. A third definition of the second object type may be received from the first software component. For example, as shown in FIG. 4A, the first object type may be "User" and the second object type may be "Job."

In Step 204, a first node labeled by the first ID is stored in a dynamic graph. That is, both the first node and the first object type are labeled with the first ID. The dynamic graph may be labeled by a first version ID. Continuing the above scenario, a second node labeled by the second ID may be stored in the dynamic graph. In addition, a link between the first node and the second node may be stored in the dynamic graph, where the link indicates a dependency between the first object type and the second object type. For example, as shown in FIG. 4A, the link (456A) indicates a dependency between the "User" object type and the "Job" object type.

In Step 206, the first definition of the object type and the second definition of the first object type are stored in a type definition repository external to the dynamic graph. The first definition of the first object type and the second definition of the first object type are indexed, in the type definition repository, by the first ID. Continuing the above scenario, the third definition of the second object type may be stored in the type definition repository, where the third definition of the second object type is indexed by the second ID.

Because object type definitions are stored in a type definition repository external to the dynamic graph, the dynamic graph does not need modification when an object type definition is modified, which avoids the need to recompile the dynamic graph (e.g., to recompile the dynamic graph to a new version of the dynamic graph). That is, software components may continue to access the current version of the dynamic graph, and access modifications to object type definitions in the type definition repository by IDs that label the modified object types, as explained below.

In Step 208, a modified first definition of the first object type is received from the first software component. The modified first definition may result from a modification to the first definition of the first object type by a user (e.g., by the first user of the first software component). For example, the modified first definition of the first object type may add, delete, and/or modify one or more properties and/or one or more references to "child" object type definitions.

Continuing the above scenario, a modified third definition of the second object type may be received from the first software component. Still continuing the above scenario, the modified third definition may result from a modification to the third definition of the second object type by the first user.

One or more modifications to the dynamic graph may be obtained from one or more software components. Each modification to the dynamic graph may add, delete, or modify a node and/or link of the dynamic graph. The one or more modifications to the dynamic graph may be applied as a batch (e.g., atomically) to generate a new version of the dynamic graph, where the new version of the dynamic graph is labeled with a second version ID.

In Step 210, the first definition of the first object type is replaced, in the type definition repository using the first ID, with the modified first definition. Continuing the above scenario, the third definition of the second object type may be replaced, in the type definition repository using the second ID, with the modified third definition.

In Step 212, a first message indicating a need to lookup, by the first ID, the modified first definition is transmitted to the second software component. Transmitting the first message (e.g., by the dynamic graph manager) to the second software component may be triggered by the modification of the first definition. The dynamic graph manager may transmit the first message to the second software component based on determining that the second software component is dependent on the first object type. For example, the dynamic graph manager may determine that a software component is dependent on an object type when the software component transmits, to the dynamic graph manager, a definition of the object type. As another example, the dynamic graph manager may determine that a software component is dependent on an object type when the software component transmits a definition of an ancestor object type of the object type or a descendant object type of the object type. Continuing this example, the ancestor object type may be a parent object type or grandparent object type, such that the object type is a child object type or grandchild object type of the parent object type. Similarly, the descendant object type may be a child object type or grandchild object type, such that the object type is a parent object type or grandparent object type of the child object type. As another example, the dynamic graph manager dynamic graph manager may determine that a software component is dependent on an object type when the software component transmits a request to subscribe to an object type. Continuing this example, the software component may transmit the request to subscribe to the object type when the software component accesses the object type (e.g., in a query).

After transmitting the first message to the second software component, the dynamic graph manager may receive, from the second software component, a request to lookup, by the first ID in the type definition repository, the modified first definition. The dynamic graph manager may retrieve the modified first definition from the type definition repository in response to the request. The dynamic graph manager may transmit, to the second software component, the modified first definition. The second software component may perform an operation using the modified first definition. For example, the operation may execute a query on a database using a property of the modified first definition of the first object type and/or a child object type referenced in the modified first definition of the first object type.

Continuing the above scenario, a second message indicating a need to lookup, by the second ID, the modified third definition of the second object type may be transmitted to the second software component based on the link connecting the first node and the second node. That is, the dynamic graph manager may determine that the second software component is dependent on the second object type because (1) the link connecting the first node and the second node indicates a dependency of the second object type on the first object type, and (2) the second software component transmitted a definition of a parent object type (i.e., the first object type) of the now-modified second object type.

Figure 3A:
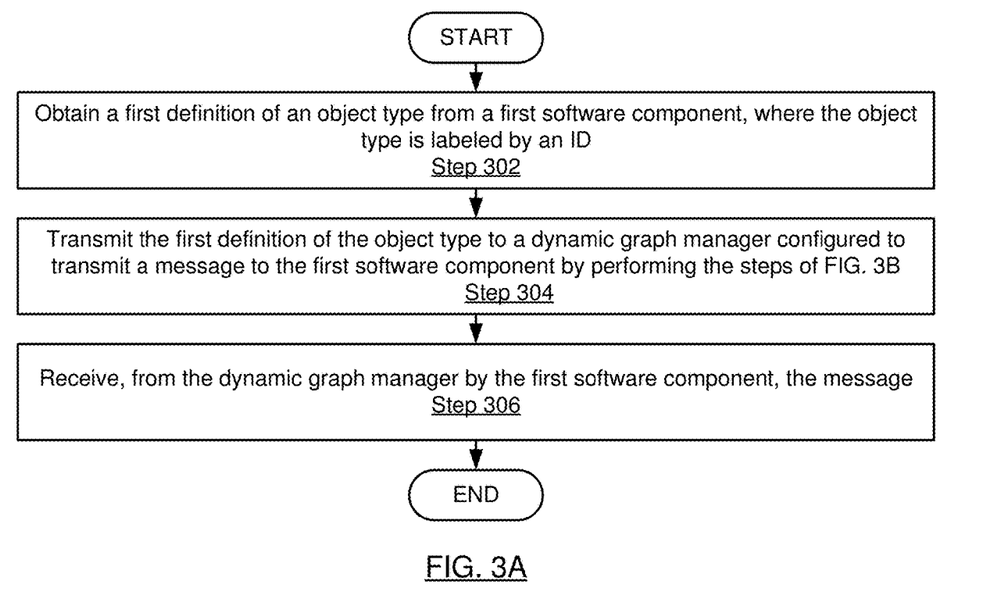

FIG. 3A shows a flowchart in accordance with one or more embodiments of the invention. The flowchart depicts a process for extending a dynamic graph. One or more of the steps in FIG. 3A may be performed by the components (e.g., the software components (106A, 106K) and the dynamic graph manager (130) of the system (100)), discussed above in reference to FIG. 1A. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 302, a first definition of a first object type is obtained from a first software component (see description of Step 202 above). The first object type is labeled by a first ID.

Figure 3B:
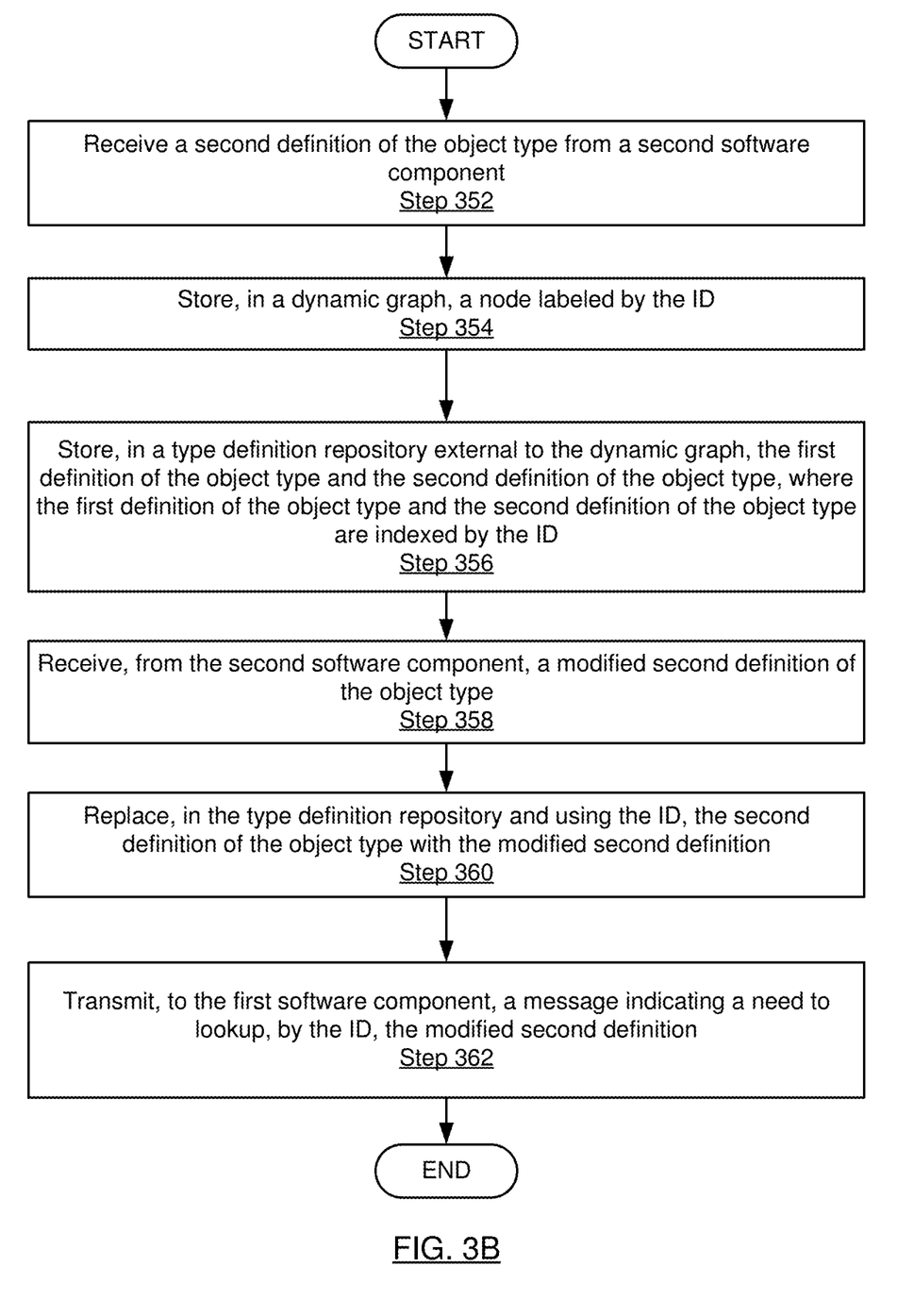

In Step 304, the first definition of the first object type is transmitted to the dynamic graph manager configured to transmit a first message to the first software component by performing the steps of FIG. 3B. The first definition of the first object type may be first definition of the first object type to the dynamic graph manager over a network.

In Step 306, the first message is received from the dynamic graph manager. The first message may be received by the first software component from the dynamic graph manager via the network.

FIG. 3B shows a flowchart in accordance with one or more embodiments of the invention. The flowchart depicts a process for extending a dynamic graph. One or more of the steps in FIG. 3B may be performed by the components (e.g., the software components (106A, 106K) and the dynamic graph manager (130) of the system (100)), discussed above in reference to FIG. 1A. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 352, a second definition of the first object type is obtained from a second software component (see description of Step 202 above).

In Step 354, a first node labeled by the first ID is stored in a dynamic graph (see description of Step 204 above).

In Step 356, the first definition of the object type and the second definition of the first object type are stored in a type definition repository external to the dynamic graph (see description of Step 206 above).

In Step 358, a modified second definition of the first object type is received from the second software component (see description of Step 208 above).

In Step 360, the second definition of the first object type is replaced, in the type definition repository using the first ID, with the modified second definition (see description of Step 210 above).

In Step 362, a first message indicating a need to lookup, by the first ID, the modified second definition is transmitted to the first software component (see description of Step 212 above). Transmitting the first message to the first software component may be triggered by the modification of the second definition. The dynamic graph manager may transmit the first message to the first software component based on determining that the first software component is dependent on the first object type.

Figure 4B:
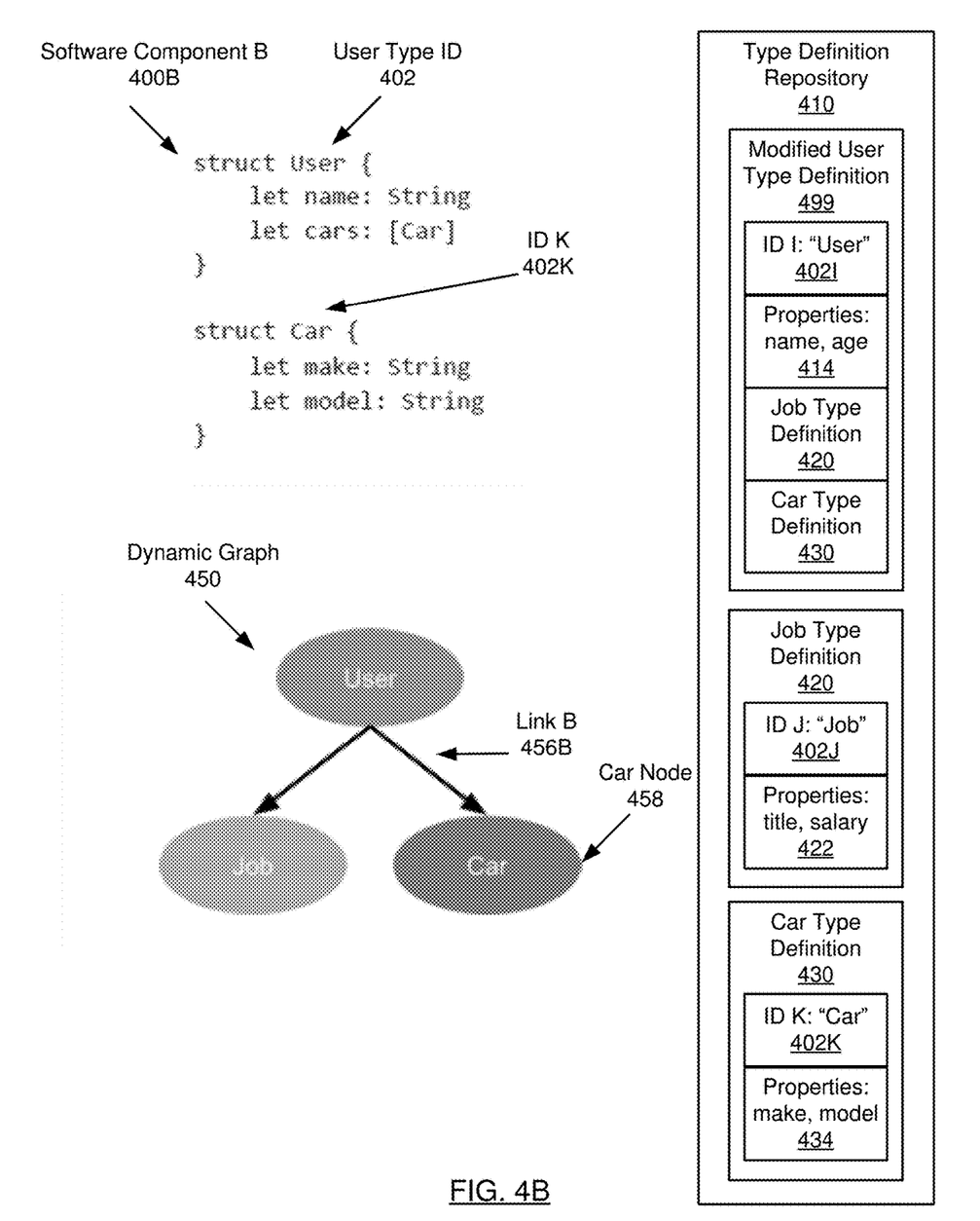

The following example is for explanatory purposes only and not intended to limit the scope of the invention. FIG. 4A and FIG. 4B show an implementation example in accordance with one or more embodiments of the invention. FIG. 4A shows software component A (400A) ((106A, 106K) in FIG. 1A) that includes object type definitions for a "user" object type labeled by ID I "user" (402I) (124F, 124S) in FIGS. 1A and ((124A, 124B, 124C, 124D, 124E) in FIG. 1B) and a "job" object type labeled by ID J "job" (402J). Software component A (400A) sends the object type definitions for the user object type and the job object type to the dynamic graph manager. The dynamic graph manager stores the user type definition (412) ((110E, 110L, 110B, 110T, 110Z) in FIG. 1A) and the job type definition (420) in the type definition repository (410) ((122) in FIG. 1A). The user type definition (412) includes ID I "user" (402I), properties "name" and "age" (414), and a reference to a child object type definition: the job type definition (420). The job type definition (420) includes ID J "job" (402J) and properties "title" and "salary" (422).

The dynamic graph manager generates a dynamic graph (450) ((128) in FIG. 1A and (150) in FIG. 1B) and adds a user node (452) ((160A, 160B, 160C, 160D, 160E) in FIG. 1B) corresponding to the user object type and a job node (454) corresponding to the job object type. The user node (452) and the job node (454) are connected by a link (456A) because the user type definition (412) includes a reference to the job type definition (420).

FIG. 4B shows a software component B (400B) that includes object type definitions for the user object type and a "car" object type labeled by ID K "car" (402K). Software component B (400B) sends the object type definitions for the user object type and the car object type to the dynamic graph manager. The dynamic graph manager generates a modified user type definition (499) by adding a reference to a child object type definition: the car type definition (430). The dynamic graph manager replaces the user type definition (412) of FIG. 4A with the modified user type definition (499) of FIG. 4B. The dynamic graph manager stores the car type definition (430) in the type definition repository (410). The car type definition (430) includes ID K "car" (402K) and properties "make" and "model" (434).

The dynamic graph manager adds a car node (458) corresponding to the car object type to the dynamic graph (450). The dynamic graph manager adds a link (456B) connecting the user node (452) and the car node (458)) because the modified user type definition (499) includes a reference to the car type definition (430).

Because software component A (400A) had previously sent the dynamic graph manager an object type definition for the user object type (i.e., user type definition (412) of FIG. 4A), the dynamic graph manager determines that software component A (400A) is dependent on the user object type. Thus, the dynamic graph manager transmits a message to software component A (400A) indicating a need to lookup in the type definition repository (410) by ID I "user" (402I), the modified user type definition (499).

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network or communication interface to any discrete component or system, for example, separate libraries or computer programs operating in parallel or independently on the same mobile device) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B.

Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving a first definition of a first object type from a first software component and a second definition of the first object type from a second software component, wherein the first object type is labeled by a first ID;
storing, in a dynamic graph, a first node labeled by the first ID;
storing, in a type definition repository external to the dynamic graph, the first definition of the first object type and the second definition of the first object type, wherein the first definition of the first object type and the second definition of the first object type are indexed by the first ID;
receiving, from the first software component, a modified first definition of the first object type, wherein the modified first definition resulted from a modification to the first definition of the first object type by a first user;
replacing, in the type definition repository and using the first ID, the first definition of the first object type with the modified first definition; and
transmitting, to the second software component, a first message indicating a need to lookup, by the first ID, the modified first definition, wherein transmitting the first message is triggered by the modification of the first definition.

2. The method of claim 1, further comprising:
receiving, from the second software component, a request to lookup, by the first ID in the type definition repository, the modified first definition;
retrieving, from the type definition repository and in response to the request, the modified first definition; and
transmitting, to the second software component, the modified first definition.

3. The method of claim 2, wherein the second software component performs an operation using the modified first definition.

4. The method of claim 1, wherein the first definition of the first object type references a third definition of a second object type labeled by a second ID, the method further comprising:
receiving, from the first software component, the third definition of the second object type,
storing, in the dynamic graph, (i) a second node labeled by the second ID, and (ii) a link connecting the first node and the second node, wherein the link indicates a dependency between the first object type and the second object type,
storing, in the type definition repository, the third definition of the second object type, wherein the third definition of the second object type is indexed by the second ID,
receiving, from the first software component, a modified third definition of the second object type, wherein the modified third definition resulted from a modification to the third definition of the second object type by a second user, replacing, in the type definition repository and using the second ID, the third definition of the second object type with the modified third definition, and transmitting, to the second software component and based on the link connecting the first node and the second node, a second message indicating a need to lookup, in the type definition repository by the second ID, the modified third definition of the second object type.

5. The method of claim 1, wherein the dynamic graph comprises: (i) a plurality of nodes comprising the first node, and (ii) a plurality of links each connecting a pair of nodes of the plurality of nodes, and wherein the dynamic graph is labeled by a first version ID, the method further comprising:

obtaining, from the first software component, a first modification to one selected from a group consisting of the plurality of nodes and the plurality of links, obtaining, from the second software component, a second modification to one selected from the group consisting of the plurality of nodes and the plurality of links, and modifying, using the first modification and the second modification, the dynamic graph to obtain a modified dynamic graph labeled by a second version ID.

6. The method of claim 1, wherein the first message is transmitted to the second software component based on receiving, from the second software component, the second definition of the first object type.

7. The method of claim 1, wherein the first software component and the second software component both execute on a same computing device.

8. A system comprising:

a computer processor;

a data repository configured to store a dynamic graph, and a type definition repository external to the dynamic graph, wherein the type definition repository is configured to store a first definition of a first object type, and a second definition of the first object type, wherein the first definition of the first object type and the second definition of the first object type are indexed by a first ID, and wherein the first object type is labeled by the first ID; and a dynamic graph manager executing on the computer processor and configured to:

receive the first definition of the first object type from a first software component and the second definition of the first object type from a second software component, store, in the dynamic graph, a first node labeled by the first ID, store, in the type definition repository, the first definition of the first object type and the second definition of the first object type, receive, from the first software component, a modified first definition of the first object type, wherein the modified first definition of the first object type resulted from a modification to the first definition of the first object type by a first user, replace, in the type definition repository and using the first ID, the first definition of the first object type with the modified first definition, and transmit, to the second software component, a first message indicating a need to lookup, by the first ID, the modified first definition, wherein transmitting the first message is triggered by the modification of the first definition.

9. The system of claim 8, wherein the dynamic graph manager is further configured to:

receive, from the second software component, a request to lookup, by the first ID, the modified first definition, retrieve, from the type definition repository and in response to the request, the modified first definition, and transmit, to the second software component, the modified first definition.

10. The system of claim 9, wherein the second software component performs an operation using the modified first definition.

11. The system of claim 8, wherein the first definition of the first object type references a third definition of a second object type labeled by a second ID, and wherein the dynamic graph manager is further configured to:

receive, from the first software component, the third definition of the second object type, store, in the dynamic graph, (i) a second node labeled by the second ID and (ii) a link connecting the first node and the second node, wherein the link indicates a dependency between the first object type and the second object type, store, in the type definition repository, the third definition of the second object type, wherein the third definition of the second object type is indexed by the second ID, receive, from the first software component, a modified third definition of the second object type, wherein the modified third definition resulted from a modification to the third definition of the second object type by a second user, replace, in the type definition repository and using the second ID, the third definition of the second object type with the modified third definition, and transmit, to the second software component and based on the link connecting the first node and the second node, a second message indicating a need to lookup, in the type definition repository by the second ID, the modified third definition of the second object type.

12. The system of claim 8, wherein the dynamic graph comprises: (i) a plurality of nodes comprising the first node and (ii) a plurality of links each connecting a pair of nodes of the plurality of nodes, wherein the dynamic graph is labeled by a first version ID, and wherein the dynamic graph manager is further configured to:

obtain, from the first software component, a first modification to one selected from a group consisting of the plurality of nodes and the plurality of links, obtain, from the second software component, a second modification to one selected from the group consisting of the plurality of nodes and the plurality of links, and modify, using the first modification and the second modification, the dynamic graph to obtain a modified dynamic graph labeled by a second version ID.

13. The system of claim 8, wherein the dynamic graph manager transmits the first message to the second software component based on receiving, from the second software component, the second definition of the first object type.

14. The system of claim 8,
wherein the first software component and the second software component both execute on a same computing device.

15. A method comprising:
obtaining a first definition of a first object type from a first software component, wherein the first object type is labeled by a first ID;
transmitting the first definition of the first object type to a dynamic graph manager configured to:
receive a second definition of the first object type from a second software component,
store, in a dynamic graph, a first node labeled by the first ID,
store, in a type definition repository external to the dynamic graph, the first definition of the first object type and the second definition of the first object type, wherein the first definition of the first object type and the second definition of the first object type are indexed by the first ID,
receive, from the second software component, a modified second definition of the first object type, wherein the modified second definition resulted from a modification to the second definition of the first object type by a first user,
replace, in the type definition repository and using the first ID, the second definition of the first object type with the modified second definition, and
transmit, to the first software component, a first message indicating a need to lookup, by the first ID, the modified second definition, wherein transmitting the first message is triggered by the modification of the second definition; and
receiving, from the dynamic graph manager and by the first software component, the first message.

16. The method of claim 15, wherein the dynamic graph manager is further configured to:
receive, from the first software component, a request to lookup, by the first ID in the type definition repository, the modified second definition,
retrieve, from the type definition repository and in response to the request, the modified second definition, and
transmit, to the first software component, the modified second definition.

17. The method of claim 16, wherein the first software component performs an operation using the modified second definition.

18. The method of claim 15,
wherein the second definition of the first object type references a third definition of a second object type labeled by a second ID, and
wherein the dynamic graph manager is further configured to:
receive, from the second software component, the third definition of the second object type,
store, in the dynamic graph, (i) a second node labeled by the second ID, and (ii) a link connecting the first node and the second node, wherein the link indicates a dependency between the first object type and the second object type,
store, in the type definition repository, the third definition of the second object type, wherein the third definition of the second object type is indexed by the second ID,
receive, from the second software component, a modified third definition of the second object type, wherein the modified third definition resulted from a modification to the third definition of the second object type by a second user,
replace, in the type definition repository and using the second ID, the third definition of the second object type with the modified third definition, and
transmit, to the first software component and based on the link connecting the first node and the second node, a second message indicating a need to lookup, in the type definition repository by the second ID, the modified third definition of the second object type.

19. The method of claim 15, wherein the dynamic graph comprises: (i) a plurality of nodes comprising the first node, and (ii) a plurality of links each connecting a pair of nodes of the plurality of nodes,
wherein the dynamic graph is labeled by a first version ID, and
wherein the dynamic graph manager is further configured to:
obtain, from the first software component, a first modification to one selected from a group consisting of the plurality of nodes and the plurality of links,
obtain, from the second software component, a second modification to one selected from the group consisting of the plurality of nodes and the plurality of links, and
modify, using the first modification and the second modification, the dynamic graph to obtain a modified dynamic graph labeled by a second version ID.

20. The method of claim 15, wherein the dynamic graph manager transmits the first message to the first software component based on receiving, from the first software component, the first definition of the first object type.

* * * * *